United States Patent
Perry et al.

(10) Patent No.: US 6,553,394 B1
(45) Date of Patent: Apr. 22, 2003

(54) CONTINUOUS MEMOIZATION

(75) Inventors: Ronald N. Perry, Cambridge, MA (US); Thouis R. Jones, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/488,584

(22) Filed: Jan. 21, 2000

(51) Int. Cl.[7] ............................................. G06F 15/00
(52) U.S. Cl. ..................................................... 708/200
(58) Field of Search .............................. 708/110, 654, 708/490, 290, 200, 620, 270; 340/146.2; 717/141, 131; 712/34

(56) References Cited

U.S. PATENT DOCUMENTS

| | | | | |
|---|---|---|---|---|
| 3,846,625 A | * | 11/1974 | Sasayama | 708/290 |
| 3,996,456 A | * | 12/1976 | Hoover | 708/110 |
| 5,260,898 A | * | 11/1993 | Richardson | 708/490 |
| 5,819,102 A | * | 10/1998 | Reed et al. | 708/654 |
| 5,828,591 A | * | 10/1998 | Rotstain | 708/290 |
| 5,862,400 A | * | 1/1999 | Reed et al. | 708/490 |
| 5,987,254 A | | 11/1999 | Subrahmanyam | |
| 6,223,192 B1 | * | 4/2001 | Oberman et al. | 708/270 |
| 6,256,653 B1 | * | 7/2001 | Juffa et al. | 708/290 |
| 6,263,323 B1 | * | 7/2001 | Baggett | 705/400 |

OTHER PUBLICATIONS

Baggett, Technique for Producing Constructed Fares, May 2, 2002, U.S. patent application Publication No. US 2002/0052854 A1.*

* cited by examiner

*Primary Examiner*—Chuong Dinh Ngo
*Assistant Examiner*—Chat C. Do
(74) *Attorney, Agent, or Firm*—Dirk Brinkman

(57) ABSTRACT

A method memoizes a computation as follows. A set of input parameters is provided to the computation. A determination is made to see whether a memo contains results of the computation on sets of memoized parameters near the set of input parameters. If true, the computation for the set of input parameters is reconstructed using the results of the computations on the sets of memoized parameters near the set of input parameters. If false, the computation is performed using the set of input parameters. A result of the computation on the set of input parameters is then memoized, and that result is provided as output of the computation.

19 Claims, 2 Drawing Sheets ic function can also be used. Furthermore, the reconstruction can be based on multiple sets of input parameters and memoized results.

CONTINUOUS MEMOIZATION

FIELD OF THE INVENTION

This invention relates generally to decreasing the number of computations that need to be done in a computer system, and more particularly to using memoization to reduce the number of computations.

BACKGROUND OF THE INVENTION

The term "memoization" is known in the field of computer science as a technique for recording and remembering the results of previous computations so that repeating the same computations can be avoided, see Field et al., in "Memoization," Addison-Wesley Publishing Company Functional Programming, Chapter 19, pp. 505–506, 1988. The term comes from the word "memo"—"A short note written as a reminder," The American Heritage Dictionary of the English Language, 1970, American Heritage Publishing. Memorization techniques have also been used to save results of data dependence tests in order to avoid calling data dependence routines multiple times for the same input. See, Dror Maydan, et al., in "Efficient and Exact Data Dependence Analysis," Proceedings of the ACMSIGPLAN 1991.

For example, it is desired to compute the Fibonacci numbers using the following simple program:

```
fib(n) {
  if n is 1 or 2, return 1;
  return fib(n-1)+fib(n-2);
}
```

A method 100 for performing this computation is shown in FIG. 1. The input parameters (I) are provided in step 110. The computation itself (F) is done in step 120, and the result (R) is provided in step 130. Because fib( ) is recomputed over and over for the same argument, run time for the above method is $O(1.6^n)$.

A more complex program computes the Fibonacci numbers as follows:

```
allocate array for memo, initializing all elements to zero
  initialize memo[1] and memo[2] to 1;
fib(n) {
  if memo[n] is not zero, return memo[n];
  memo[n]=fib(n-1) +fib(n-2);
  return memo[n];
}
```

When the value of fib(n) is memoized, the run time is reduced and becomes $O(1)$ if n is in the memo and $O(n)$ if n is not in the memo.

FIG. 2 shows how memoization is used to speed up the method. As above input 210 is provided in step 210. Step 215 determines whether a result (R) for this particular input (I) is contained in a memo 216. If true, the memo is read and the result (R) is provided in step 230. Otherwise, if false, compute the result (R). in step 220, memoize the result in the memo, and provide the result in step 230.

The problem with this method is that the input must exactly match what is contained in the memo, that is the memo is limited to storing and producing discrete values, and thus the prior art memoization method has limited utility. The need remains to provide a more efficient and versatile memoization method.

SUMMARY OF THE INVENTION

A method memoizes a computation as follows. A set of input parameters are provided to the computation. A determination is made to see whether a memo contains results of the computation on sets of memoized parameters near the set of input parameters. If true, the computation for the set of input parameters is reconstructed using the results of the computations on the sets of memoized parameters near the set of input parameters. If false, the computation is performed using the set of input parameters. A result of the computation on the set of input parameters is then memoized, and that result is provided as output of the computation.

Reconstruction can be done by applying some continuous function, such as interpolation, on the memoized results. Additionally, the computation can be partitioned into a number of partial computations, and only selected partial computations are memoized.

DETAILED DESCRIPTION OF THE PREFERRED EMBODIMENT

Introduction

We define continuous memoization as a method that memoizes results of full or partial computations on discrete sets of input parameters. We use the results to reconstruct the computation of an unknown set of input parameters by applying a continuous function on the memoized results. This method avoids recomputing the result for every discrete set of input parameters. In other words, from discrete memoized results we reconstruct results for continuous sets of input parameters.

Continuous Reconstruction Functions

Figure 4:
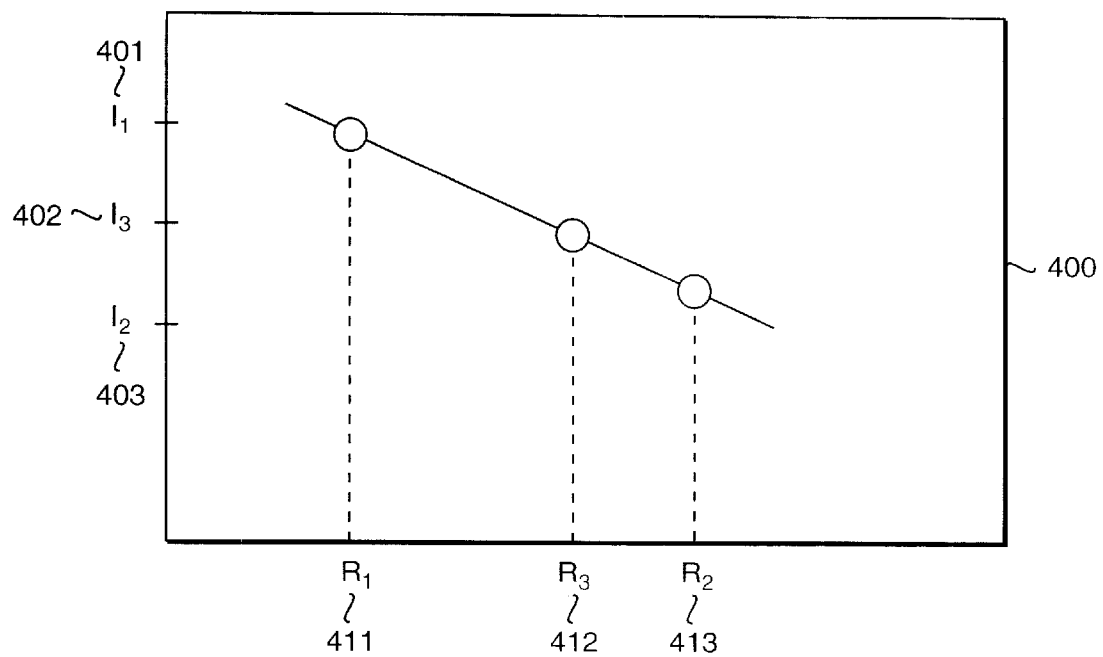
FIG. 4 is a graph of continuous memoization according to the invention.

FIG. 4 is a graph 400 that shows the continuous memoization method according to our invention. The graph plots sets of input parameters (I) on the y-axis, and corresponding memoized results (R) on the x-axis. It should be understood that this graph is only an example and that the inputs and results can have any number of dimensions.

In the graph 400, a value $I_1$ 401 represents a first set of input parameters contained in a memo, and $R_1$ 411 the corresponding result for some computation (F). Similarly, $I_2$ 402 and $R_2$ 412 are a second set of input parameters and corresponding results. A next computation has a set of input parameters $I_3$. In this case, the memo does not contain a corresponding result.

At this point, prior art memoization methods would perform the computation (F). However, according to our invention, a determination is made to see whether the third set of parameters is "near" previously contained sets of parameters. If true, as in the example illustrated in FIG. 4, the results of the nearby sets of parameters, i.e., $R_1$ and $R_2$ are interpolated to obtain a result $R_3$.

In the example, the continuous interpolation function is linear. However, it should be understood the interpolation can be bilinear and trilinear depending on the dimensionality of the parameter space. Other nonlinear continuous func tions can also be used such as exponential and logarithmic. One could also use continuous filters, such as a Gaussian filter, to derive the desired computation.

Sufficiency of Memo

Any number of known techniques can be used to determine whether the memo contains sufficient results to reconstruct the computation. For example, if the interpolation is bilinear, then having four results for input parameters located at the four grid corners of a cell would be sufficient to reconstruct any parameter set that lies within that cell. If the interpolation is trilinear, the eight corners of a "box" would be sufficient to reconstruct results for any parameters located within the box. Sufficiency, in most cases, is determined by the nature of the input parameters, the computation, and the reconstruction method.

Continuous Memoization Method

Figure 5:
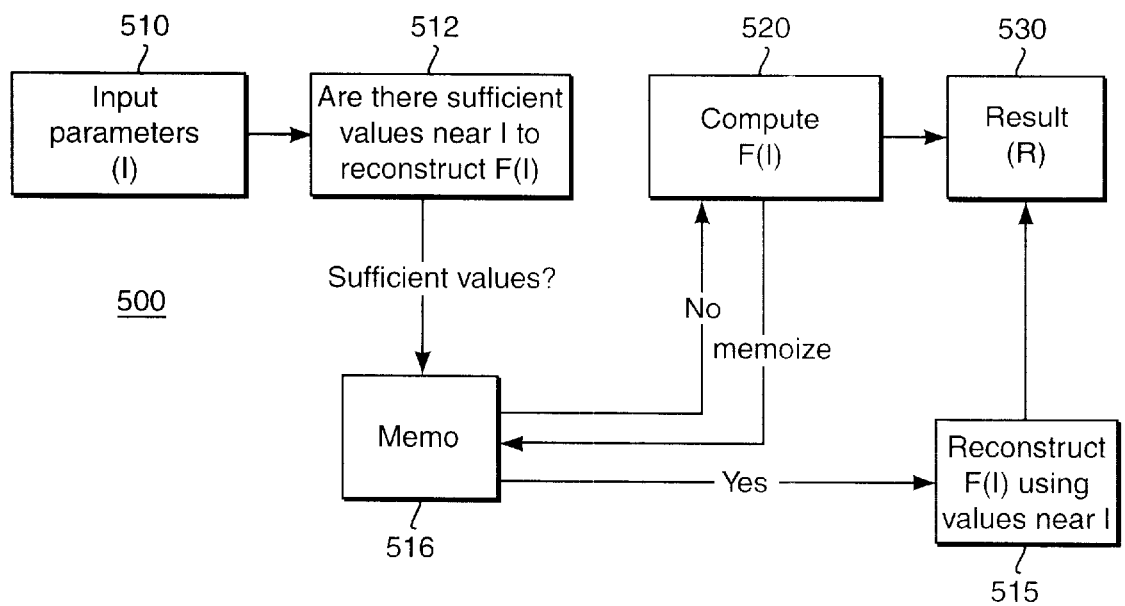
FIG. 5 is a block diagram of a process with continuous memoization according to the invention.

FIG. 5 shows a method 500 that implements continuous memoization according to the invention. A set of input parameters (I) are provided in step 510. Step 512 determines whether a memo 516 contains results of parameters sets near the set of input parameters. If true, reconstruct the computation by interpolating the memoized results, and provide the reconstructed result (R) in step 530. Otherwise, perform the computation (F) and memoize the result in step 520, and continue with step 530.

Partial Computations

In some cases, memoizing the results of full computations may be too difficult, or too costly in memory storage to gain any advantage. In such cases, we partition the computation into a plurality of partial computations. For example, a computation F is partitioned into partial computations, e.g., $F_1$, $F_2$, and $F_3$. Assume we make the decision to only memoize the parameters and results for the partial computation $F_2$. Then, we can combine the reconstruction of $F_2$ with the partial computations $F_1$ and $F_3$ to obtain the complete result. Of course, we could also memoize each partial computation to simplify the memoization problem, or choose other combinations of partial computations.

Example Partial Computation

The following exemplary program illustrates our continuous memoization with partial computations.

For four input parameters (I), it is desired to perform the following computation:

```
float computeSomething (a1, a2, a3, a4)
{
    // a1 and a2 are the memoized parameters
    f1=log(cos(a1)*(sin(a1)-a1*a1*a1*a1))
    f2=sqrt(a2*abs(sin(a2)-cos(a2-1)))
    f3=sqrt(a1*a1+a2*a2+(a1-a2)*(a1-a2))
    f4=f1*(log(f1)-log(f2)*sin(f3))
    f5=f4*sqrt(a3*a3+a4*a4+(a3-a4)*(a3-a4))
    return(f5)
}
```

In order to reduce the run time of this program, we rewrite the program computeSomething as two functions, e.g., two partial computations: computeSomething_memoize and computeSomething.

```
// Memoize the partial computation f4 for location (a1,a2)
computeSomething_memoize (a1, a2)
{
    // a1 and a2 are the memoized parameters
    f1=log(cos(a1)*(sin(a1)-a1*a1*a1*a1))
    f2=sqrt(a2*abs(sin(a2)-cos(a2-1)))
    f3=sqrt(a1*a1+a2*a2+(a1-a2)*(a1-a2))
    f4=f1*(log(f1)-log(f2)*sin(f3))
    memoize("computeSomething_memo",a1,a2,f4)
}
and
// The original computation rewritten to use continuous
   memoization float computeSomething (a1, a2, a3, a4)
{
    f4=reconstruct(a1,a2)
    f5=f4*sqrt(a3*a3+a4*a4+(a3-a4)*(a3-a4))
    return(f5)
}
```

The function memoize memoizes f4 at location (a1,a2) in the memo computeSomething_memo.

The function reconstruct calculates f4 by interpolating values contained in the memo computeSomething_memo "near" the requested (a1,a2) location. If locations near (a1, a2) are empty, then reconstruct invokes the function computeSomething_memoize to compute the necessary values for interpolation.

Continuous Memoization for Partial Computation

Figure 1:
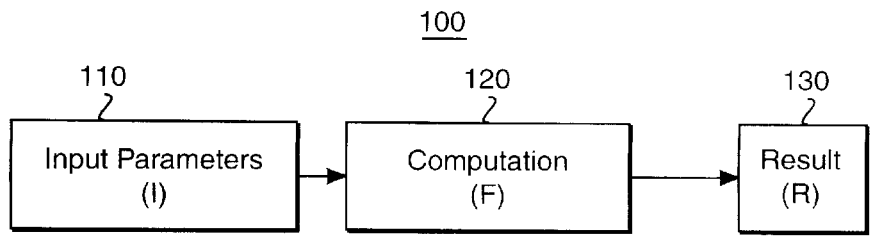
FIG. 1 is a block diagram of a conventional computational process.
Figure 2:
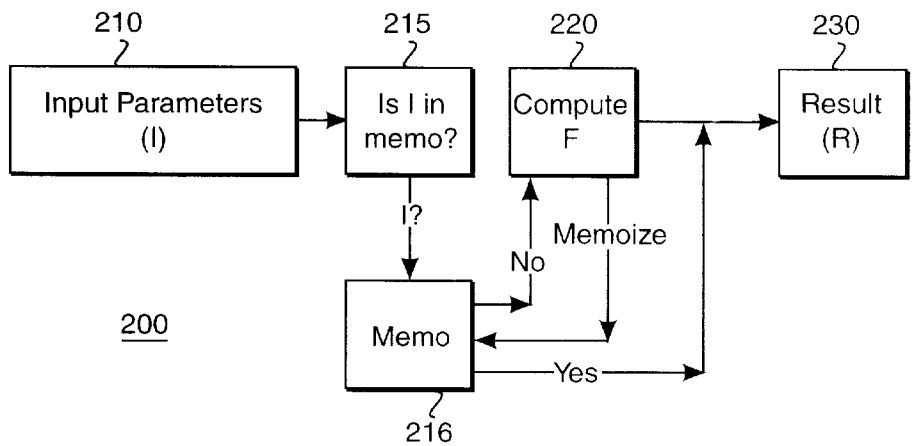
FIG. 2 is a block diagram of a process with memoization.
Figure 3:
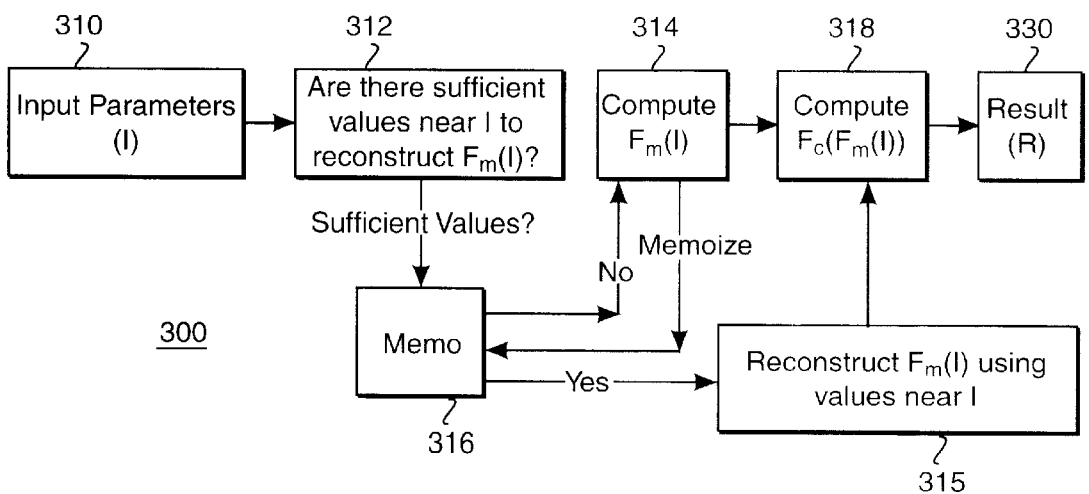
FIG. 3 is a block diagram of the process with partial continuous memoization according to the invention.

Our partial continuous memoization is shown in FIG. 3. The set of input parameters is provided in step 3 10. Step 3 12 determines whether there are sufficient parameters in the memo 316 that are near (I) for reconstructing $F_m(I)$, where $F(I)=F_c(F_m(I))$. If sufficient parameters are not available, then determine the partial computation $F_m(I)$ in step 314, and memoize the result of the partial computation in the memo 316. The result of the partial computation is then used in step 318 to complete the full computation $F_c(F_m(I))$. This full computation is then provided to step 330. Otherwise, if sufficient parameters are available, then $F_m(I)$ is reconstructed in step 315 using the results of the previously memoized partial computations on input parameters that are near I. The reconstruction can be done using an interpolatory function suitable for the computation. Linear interpolation, bilinear interpolation, and trilinear interpolation are examples of an interpolatory function, where the particular function to use would depend on the number of memoized input parameters in the set.

Continuous memoization does not require the full computation to be decomposed into two stages ($F_c$ and $F_m$) as described above. In fact, continuous memoization can be used to accelerate computations that consist of any number of stages. For example, if a computation G is comprised of the four stages $G_1$, $G_2$, $G_3$, and $G_4$, continuous memoization can be applied to a single stage such as $G_2$ and to any combination of multiple stages such as $G_1$ and $G_3$. Some stages may not be amenable to continuous memoization because they are too complex, e.g., require too many parameters to memoize, or the computation of the stage is extremely unpredictable, and therefore to difficult to reconstruct accurately.

Memo Structure

In a preferred embodiment, the memo is stored in a cache like memory device. Least recently used replacement (LRU) algorithms can be used to keep the cache at a reasonable size. The cache can be partitioned into tiles, where a tile is the minimal amount of a memo that can be accessed for reading or writing. The size of the tile can be adjusted for a particular computation.

In addition, the memo can be maintained at multiple levels of resolution, for example, the tiles can be arranged as a pyramid with coarse, middle, and fine resolutions. Continuous functions can than be applied to derive results for intermediate resolutions, as required.

Also, if a computation must be done, then it might be advantageous to also compute results for other nearby parameters. For example, if a particular input parameter has a value of 0.5, it might also be efficient to compute the memoized data for the range [0.4,0.6] at the same time, because, for many computations in the continuous domain, coherency of input parameters is frequently observed. Also, for many computations, determining n results does not increase the compute time by a factor of n, but rather, by a factor that is much smaller than n. Therefore, in the long term, when millions of computations need to be performed in a continuous parameter domain, the extra computation in anticipation of needing the results will pay off.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for operating a computing device to obtain a computation result, comprising the steps of:
   providing a set of input parameters;
   determining if a memo contains results of a computation on sets of memoized parameters near the set of input parameters; and
   if true, reconstructing the computation for the set of input parameters using the results of the computations on the sets of memoized parameters near the set of input parameters.

2. The method of claim 1 further comprising the steps of:
   if false, performing the computation using the set of input parameters;
   memoizing a result of the computation on the set of input parameters; and
   providing the result of the computation on the set of input parameters.

3. The method of claim 2 further comprising the steps of:
   performing the computation using a plurality of sets of input parameters;
   memoizing a plurality of results of the computation on the plurality of sets of input parameters, wherein the plurality of sets of input parameters are coherently related.

4. The method of claim 1 wherein the reconstructing applies a continuous function on the results of the computation on sets of memoized parameters near the set of input parameters.

5. The method of claim 4 wherein the continuous function interpolates the results of the computation on sets of memoized parameters near the set of input parameters.

6. The method of claim 1 further comprising the steps of:
   partitioning the computation into a plurality of partial computations; and
   memoizing partial results of at least one of the partial computations.

7. The method of claim 1 wherein the memo is partitioned into a plurality of tiles for accessing.

8. The method of claim 7 wherein the tiles are accessed using a least recently used caching algorithm.

9. The method of claim 1 wherein the memo is maintained at multiple levels of resolution.

10. A method of operating a computing device to obtain a computation result, comprising:
    storing at least one memo, each memo including results of a computation for an associated respective set of memoized parameters;
    entering a set of input parameters;
    determining that the respective set of memoized parameters associated with one of the stored at least one memo is near the entered set of input parameters; and
    reconstructing a result of the computation for the entered set of input parameters based on the respective set of memoized parameters associated with the one stored memo.

11. A method according to claim 10, wherein the at least one memo is a plurality of memos, and further comprising:
    generating each of the plurality of memos by memoizing the results of the computation for the respective set of memoized parameters associated with that memo.

12. A method according to claim 10, wherein the at least one memo is a plurality of memos, and further comprising:
    entering another set of input parameters;
    determining that none of the sets of memoized parameters associated with the stored plurality of memos is near the entered other set of input parameters;
    computing a result of the computation for the entered other set of input parameters;
    generating another memo by memoizing the computed results of the computation for the entered other set of input parameters; and
    storing the generated other memo with the plurality of memos.

13. A method according to claim 10, wherein:
    the result of the computation is reconstructed for the entered set of input parameters based on the respective set of memoized parameters associated with the one stored memo by application of a continuous function.

14. A method according to claim 13, wherein the continuous function is one of a linear function and a non-linear function.

15. A method according to claim 13, wherein the continuous function is a interpolation function, an exponential function, a logarithmic function, and a Gaussian function.

16. A method according to claim 10, wherein the at least one memo is a plurality of memos, and further comprising:
    partitioning results of a complex computation for a plurality of the respective sets of memoized parameters; and
    generating each of the plurality of memos by memoizing the partitioned results of the complex computation for one of the plurality of respective sets of memoized parameters.

17. A method according to claim 10, wherein:
    the at least one memo is a plurality of memos; and
    reducing a number of the stored plurality of memos based on a least recently used algorithm.

18. A method according to claim 10, wherein:
    the at least one memo is stored at a first resolution and at a second resolution different than the first resolution;
    the entered set of input parameters correspond to a third resolution different than the first and the second resolution; and
    the result of the computation for the entered set of input parameters corresponding to the third resolution is reconstructed based on the respective set of memoized parameters associated with the one stored memo at both the first resolution and second resolution.

19. A method according to claim 10, wherein the at least one memo is a plurality of memos, and further comprising:
    entering another set of input parameters;
    determining that none of the sets of memoized parameters associated with the stored plurality of memos is near the entered other set of input parameters;

identifying a further set of input parameters coherently related to the entered other set of input parameters;

computing a result of the computation for the entered other set of input parameters and for the identified further set of input parameters;

generating first other memo by memoizing the computed results of the computation for the entered other set of input parameters and a second other memo by memoizing the computed results of the computation for the identified further set of input parameters; and storing the generated first and the generated second other memos with the plurality of memos.

* * * * *